US012180760B2

(12) United States Patent
Inamasa

(10) Patent No.: US 12,180,760 B2
(45) Date of Patent: Dec. 31, 2024

(54) LOCK MECHANISM

(71) Applicant: TMEIC Corporation, Chuo-ku (JP)

(72) Inventor: Keisuke Inamasa, Tokyo (JP)

(73) Assignee: TMEIC Corporation, Chuo-ku (JP)

( * ) Notice: Subject to any disclaimer, the term of this patent is extended or adjusted under 35 U.S.C. 154(b) by 158 days.

(21) Appl. No.: 17/995,964

(22) PCT Filed: May 29, 2020

(86) PCT No.: PCT/JP2020/021371
§ 371 (c)(1),
(2) Date: Oct. 11, 2022

(87) PCT Pub. No.: WO2021/240794
PCT Pub. Date: Dec. 2, 2021

(65) Prior Publication Data
US 2023/0184011 A1 Jun. 15, 2023

(51) Int. Cl.
*E05C 3/06* (2006.01)
*E05C 3/00* (2006.01)
*E05C 9/04* (2006.01)

(52) U.S. Cl.
CPC ................ *E05C 3/06* (2013.01); *E05C 3/008* (2013.01); *E05C 9/048* (2013.01)

(58) Field of Classification Search
CPC ............. E05C 3/06; E05C 3/008; E05C 9/048
See application file for complete search history.

(56) References Cited

U.S. PATENT DOCUMENTS 2,202,534 A * 5/1940 McGunn ................. E05B 43/00 70/274
5,209,168 A * 5/1993 Chapron ................... E05C 9/00 70/144

(Continued)

FOREIGN PATENT DOCUMENTS

DE 296 07 611 U1 8/1996
JP 2007-278004 A 10/2007

(Continued)

OTHER PUBLICATIONS

International Search Report issued Aug. 4, 2020 in PCT/JP2020/021371 filed on May 29, 2020, 2 pages (with English Translation).

*Primary Examiner* — Mark A Williams
(74) *Attorney, Agent, or Firm* — Oblon, McClelland, Maier & Neustadt, L.L.P.

(57) ABSTRACT

A lock mechanism according to an embodiment includes an engaging portion, a hook, and a pressing portion. The engaging portion is provided in any one of a housing and a door that is configured to open and close a housing opening portion of the housing. The hook is provided in the other one of the housing and the door to be rotatable around a rotation axis, is engageable with the engaging portion, and is normally disengaged from the engaging portion by its own weight. The pressing portion is provided separately from the hook and is configured to press the hook. The hook includes a hook side engaging portion that is configured to engage with the engaging portion with the rotation axis interposed therebetween, and a hook side pressing portion that is configured to cause the engaging portion to engage with the hook side engaging portion by being pressed by the pressing portion.

7 Claims, 14 Drawing Sheets

(56) References Cited

U.S. PATENT DOCUMENTS

| | | | | |
|---|---|---|---|---|
| 5,517,006 | A * | 5/1996 | Fredriksson | F24C 15/022 49/31 |
| 6,425,612 | B1 * | 7/2002 | Schaeffer | E05C 3/04 292/341.15 |
| 7,338,096 | B2 * | 3/2008 | Si | E05C 19/06 292/87 |
| 2008/0148642 | A1 * | 6/2008 | Mathieu | E05C 9/1875 49/395 |
| 2012/0194044 | A1 * | 8/2012 | Niedzwiecki | E05B 63/24 312/215 |
| 2012/0255233 | A1 * | 10/2012 | Phillips | F42D 1/00 49/394 |
| 2014/0373456 | A1 * | 12/2014 | Phillips | F42B 8/00 49/394 |
| 2015/0240538 | A1 * | 8/2015 | Mittelbach | E05B 77/34 292/195 |
| 2015/0240540 | A1 * | 8/2015 | John | E05C 17/48 292/281 |
| 2016/0040458 | A1 * | 2/2016 | Walters | E05C 9/08 292/197 |
| 2016/0060898 | A1 * | 3/2016 | Michael | B65F 1/1615 292/200 |

FOREIGN PATENT DOCUMENTS

| | | | |
|---|---|---|---|
| JP | 2014-114614 | A | 6/2014 |
| JP | 2015-74946 | A | 4/2015 |
| JP | 2019-138057 | A | 8/2019 |

* cited by examiner

LOCK MECHANISM

TECHNICAL FIELD

Embodiments of the present invention relate to a lock mechanism.

BACKGROUND ART

For example, a control panel in which a circuit, such as a power conversion system, is accommodated includes a box-shaped housing having an opening portion and a door that closes the opening portion of the housing. In a case in which the door is closed, by turning the handle provided in the door, the door engages with the housing and the closed state of the door is maintained.

By the way, a larger power than a predetermined value may flow in a circuit in a large-scale power conversion system. In such a case, there is a possibility of occurring arc flash or the like in the housing of the control panel. It is conceivable to provide a lock mechanism that is explosion proof separately from the handle such that the door is not opened carelessly due to the impact in a case of occurring the arc flash or the like.

For example, it is conceivable to fasten and fix parts other than the handle of the door (upper and lower parts of the door and four corners of the door) to the housing using bolts. In such a case, it is necessary to tighten or loosen the bolt every time the door is opened and closed, which makes the opening portion and closing operation of the door troublesome.

It is conceivable to provide the lock mechanism in the door separately from the handle. Examples of the lock mechanism include a mechanism including a hook that rotates around a rotation axis, an engaging portion that engages with the hook, and a spring that maintains an engagement state or disengagement state of the hook with the engaging portion.

However, the lock mechanism as described above has a complicated structure and may increase the cost. In a case in which the lock mechanism is provided separately from the handle, engagement and disengagement operation of the lock mechanism is performed in addition to the opening portion and closing operation of the handle. For this reason, there is a possibility of the opening portion and closing operation of the door being troublesome.

CITATION LIST

Patent Document

[Patent Document 1]
Japanese Unexamined Patent Application, First Publication No. 2014-114614
[Patent Document 2]
Japanese Unexamined Patent Application, First Publication No. 2019-138057

SUMMARY OF INVENTION

Technical Problem

An object of the present invention is to provide a lock mechanism capable of simplifying the structure while satisfying the explosion proof function and also simplifying the opening portion and closing operation of the door.

Solution to Problem

A lock mechanism according to an embodiment includes an engaging portion, a hook, and a pressing portion. The engaging portion is provided in any one of a housing and a door that is configured to open and close a housing opening portion of the housing. The hook is provided in the other one of the housing and the door to be rotatable around a rotation axis, is engageable with the engaging portion, and is normally disengaged from the engaging portion by its own weight. The pressing portion is provided separately from the hook and is configured to press the hook. The hook includes a hook side engaging portion that is configured to engage with the engaging portion with the rotation axis interposed therebetween, and a hook side pressing portion that is configured to cause the engaging portion to engage with the hook side engaging portion by being pressed by the pressing portion.

DESCRIPTION OF EMBODIMENTS

Hereinafter, a lock mechanism according to the embodiments will be described with reference to the drawings.

First Embodiment

Figure 1:
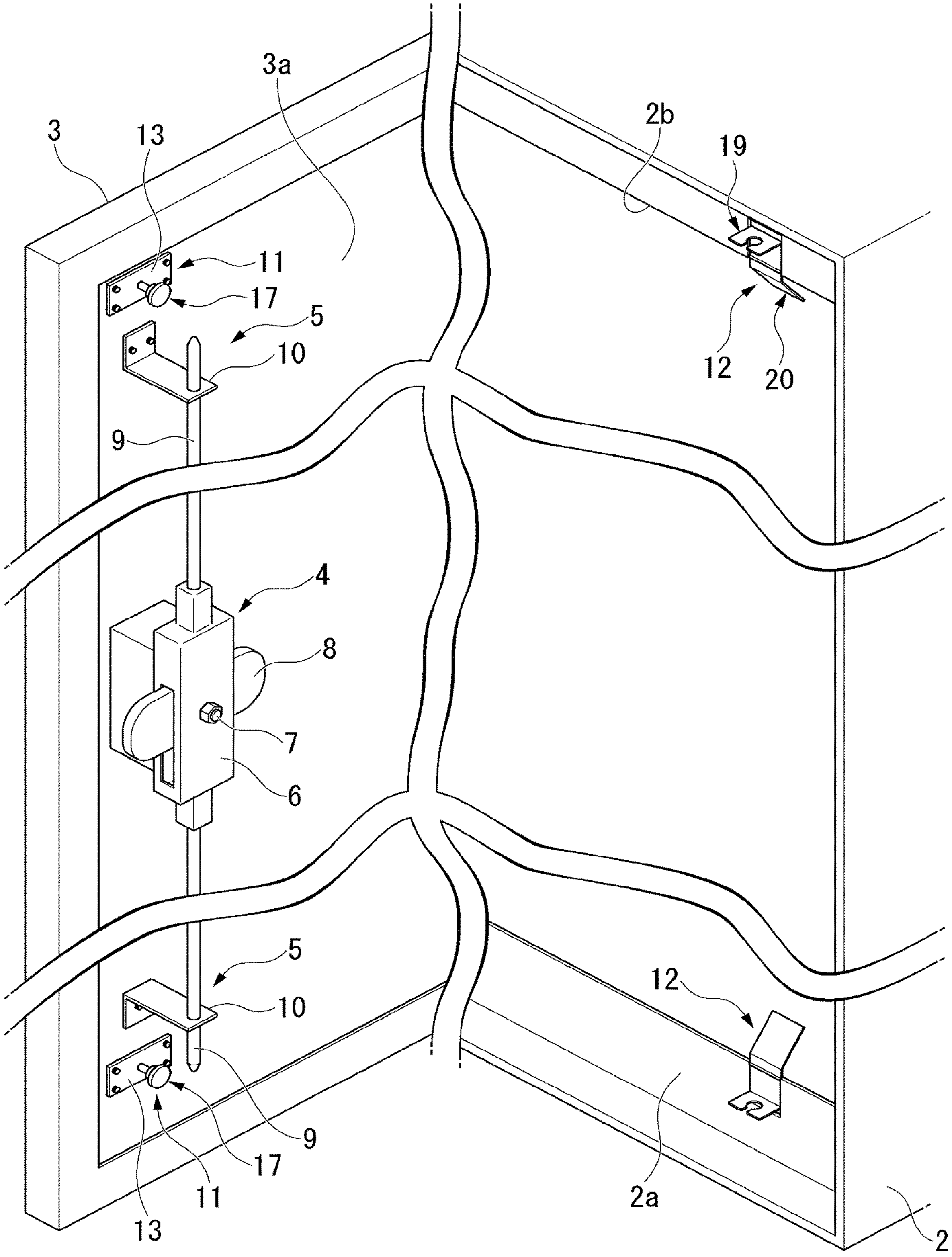
FIG. 1 is a perspective view of a control panel according to a first embodiment.

FIG. 1 is a perspective view of a control panel 1 in which a circuit, such as a power conversion system, is accommodated.

The control panel 1 includes a box-shaped housing 2 that includes an opening portion (an example of a housing opening portion in the claim) 2*b* on a front surface 2*a*, a door 3 that opens and closes the opening portion 2*b* of the housing 2, a handle unit 4 that is provided in the door 3, and a lock mechanism 5 that is provided between the housing 2 and the door 3. In the following description, a vertical direction in a state in which the control panel 1 installed is simply referred to as the vertical direction, and a horizontal direction in a state in which the control panel 1 installed is simply referred to as the horizontal direction.

The housing 2 is formed to be long in the vertical direction. The door 3 is rotatably supported by a rotation support member (not shown) provided on one side of the opening portion 2*b* of the housing 2 in the horizontal direction. The handle unit 4 and the lock mechanism 5 are provided on one side of the door 3 opposite to the rotation support member.

Figure 2:
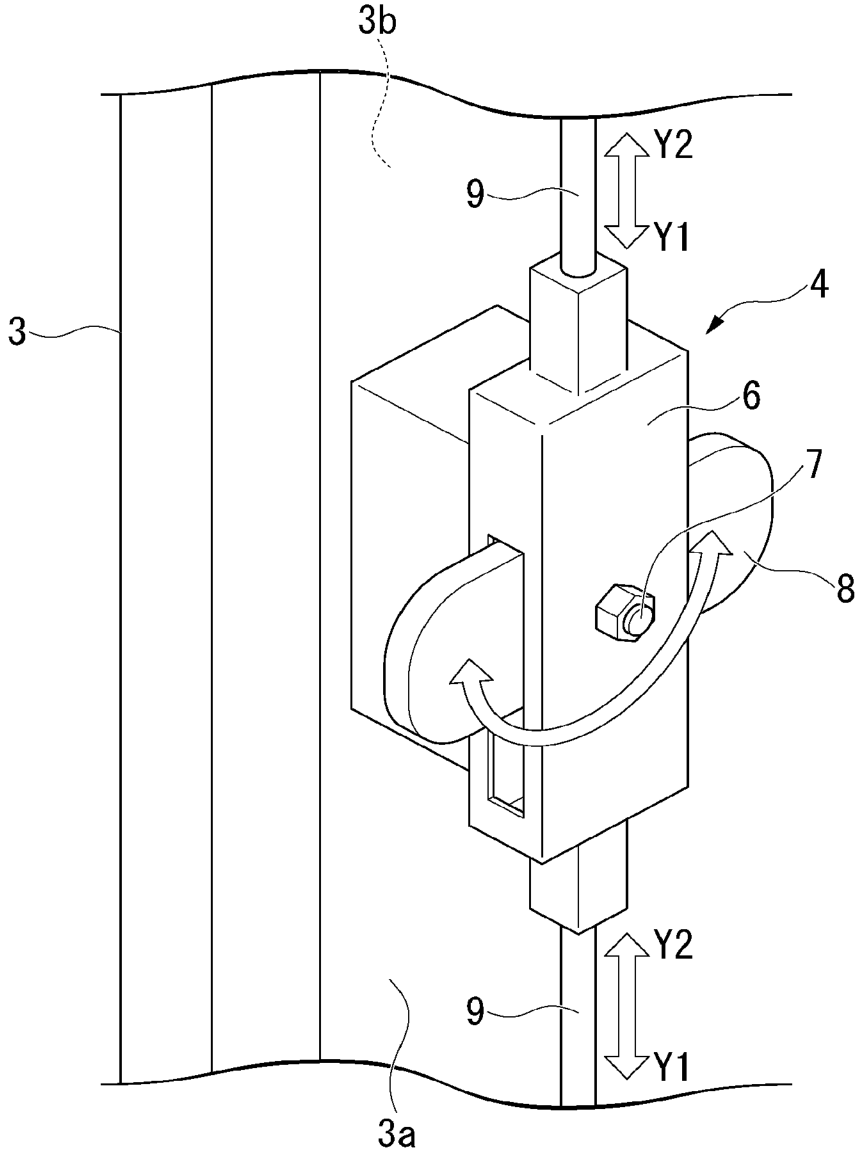
FIG. 2 is a perspective view of a handle unit according to the embodiment as viewed from a back surface side of a door.

FIG. 2 is a perspective view of the handle unit 4 as viewed from a back surface 3*a* side of the door 3.

The handle unit 4 is provided at the center of the door 3 in the vertical direction, as shown in FIG. 2. The handle unit 4 includes a handle (not shown) that is provided on a front surface 3*b* side of the door 3, a support 6 that is provided on the back surface 3*a* side of the door 3, an engagement piece 8 that is rotatably supported by the support 6, a handle rotation shaft 7 that penetrates the door 3, is rotatably supported by the door 3 and the support 6, and connects the handle (not shown) and the engagement piece 8.

The support 6 is formed in a long plate shape in the vertical direction. The handle rotation shaft 7 is connected to the center of the support 6 in a longitudinal direction.

The engagement piece 8 rotates integrally with the handle (not shown) via the handle rotation shaft 7.

The engagement piece 8 protrudes toward a peripheral edge of the opening portion 2*b* of the housing 2 from an end surface in a short-length direction of the support 6 in a state in which the door 3 is closed and the handle (not shown) is locked (hereinafter, referred to as a handle lock state). As a result, the engagement piece 8 engages with the peripheral edge of the opening portion 2*b* of the housing 2 in the handle lock state (hereinafter, referred to as an engagement state of the engagement piece 8). Further, in a case in which the handle (not shown) is rotated to release the handle lock state when the door 3 is opened, the engagement piece 8 is accommodated in the support 6. As a result, the engagement piece 8 is disengaged from the peripheral edge of the opening portion 2*b* of the housing 2 (hereinafter, referred to as a disengagement state of the engagement piece 8).

Further, one end of a lock rod (an example of a pressing portion in the claim) 9 is supported on both ends of the support 6 in the longitudinal direction to be slidingly movable along the vertical direction. Among the two lock rods 9, one lock rod 9 extends in the vertical direction from the support 6 to an upper portion of the door 3. Among the two lock rods 9, the other lock rod 9 extends along the vertical direction from the support 6 to a lower portion of the door 3. The other end of each lock rod 9 is slidingly and movably supported by guide portions 10 provided in the upper and lower portions of the back surface 3*a* of the door 3.

Each lock rod 9 is slidingly moved in the vertical direction as the engagement piece 8 (handle that is not shown) rotates. More specifically, in the disengagement state of the engagement piece 8, the two lock rods 9 are retracted toward the center of the door 3 in the vertical direction (see arrow Y1 in FIG. 2). On the other hand, in the engagement state of the engagement piece 8, the two lock rods 9 protrude in the vertical direction of the door 3 (see arrow Y2 in FIG. 2). The two lock rods 9 each operate the lock mechanism 5.

The lock mechanism 5 is disposed close to the upper and lower end portions of the housing 2 and the door 3 and the other end of the corresponding lock rods 9. The two lock mechanisms 5 provided in the upper and lower end portions of the housing 2 and the door 3 are disposed in opposite directions in the vertical direction, and have the same structure. Therefore, in the following description, among the two lock mechanisms 5, the lock mechanism 5 provided in the upper end portions of the housing 2 and the door 3 will be described, and if necessary, the lock mechanism 5 provided in the lower end portions of the housing 2 and the door 3 will be described.

The lock mechanism 5 includes a lock protrusion portion (an example of a protrusion portion in the claim) 11 that is provided on the back surface 3*a* of the door 3, and a hook 12 that is provided in the peripheral edge of the opening portion 2*b* of the housing 2.

Figure 3:
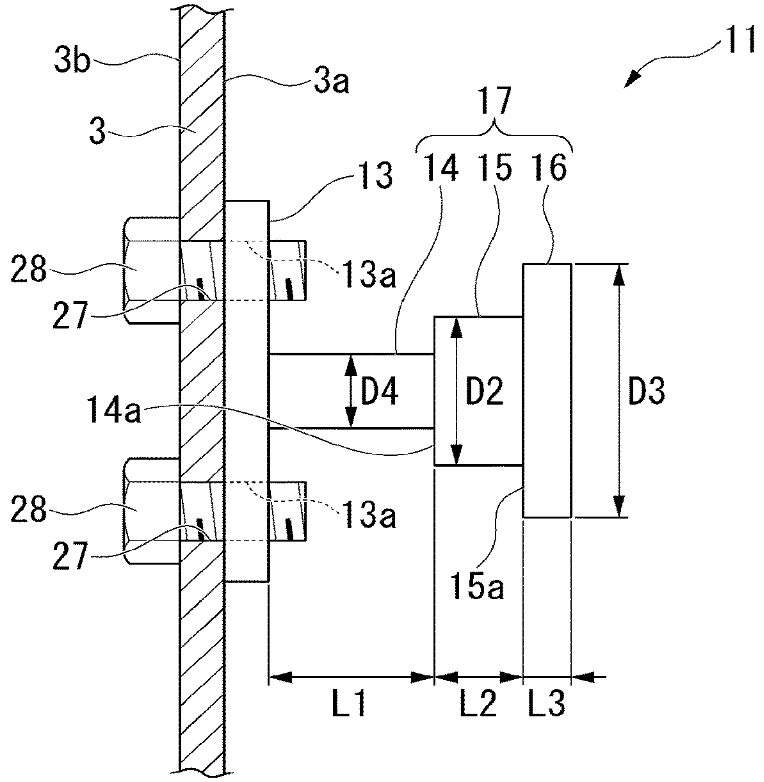
FIG. 3 is a side view of a lock protrusion portion according to the first embodiment.
Figure 4:
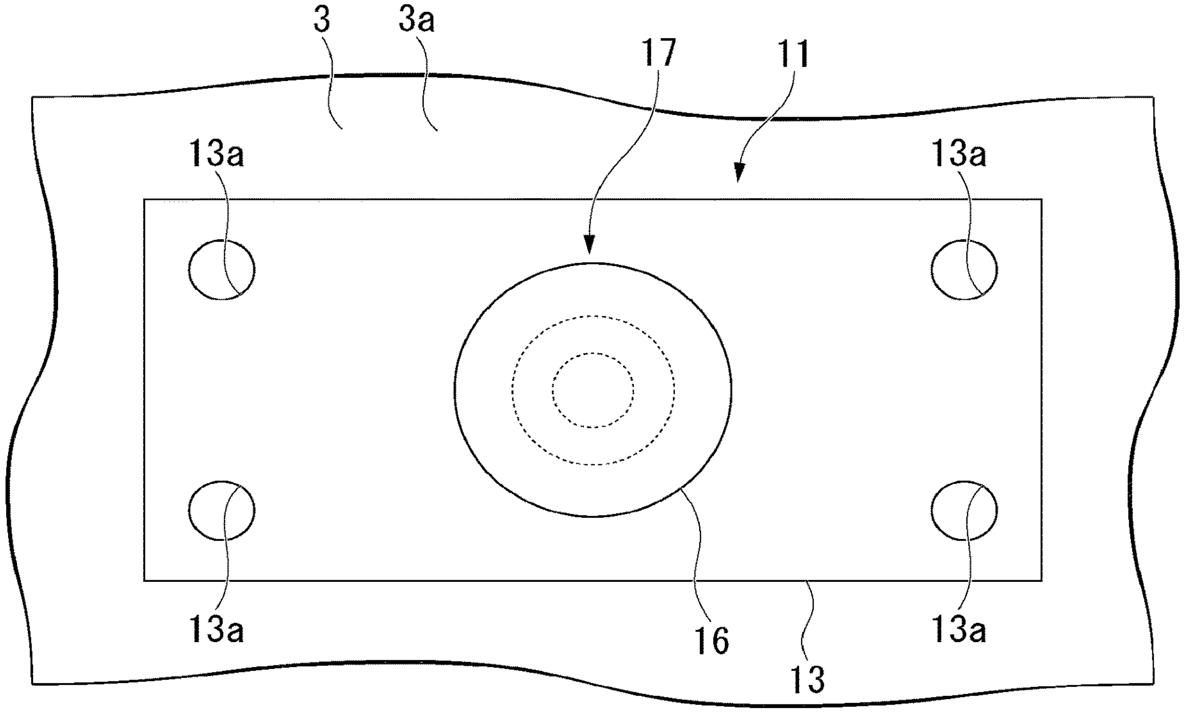
FIG. 4 is a front view of a lock protrusion portion according to the first embodiment.

FIG. 3 is a side view of the lock protrusion portion 11. FIG. 4 is a front view of the lock protrusion portion 11.

As shown in FIGS. 3 and 4, the lock protrusion portion 11 includes a base portion 13 that is fixed to the back surface 3*a* of the door 3, and a stepped shaft portion 17 that protrudes from the base portion 13.

The base portion 13 is a rectangular plate-shaped member that is long in the horizontal direction as the back surface 3*a* of the door 3 is viewed. At each of four corners of the base portion 13, a female screw portion 13*a* is formed. At a portion of the door 3 corresponding to the female screw portion 13*a*, a through hole 27 is formed. The base portion 13 is fastened and fixed to the back surface 3*a* of the door 3 by inserting bolt 28 into the through hole 27 from the front surface 3*b* side of the door 3, and screwing the bolt 28 into the female screw portion 13*a*.

The stepped shaft portion 17 protrudes along a normal direction (horizontal direction) of the base portion 13. Stated another way, the stepped shaft portion 17 protrudes along the opening portion and closing direction of the door 3.

The stepped shaft portion 17 includes a first shaft portion 14 that protrudes from the base portion 13, a second shaft portion 15 that is integrally formed in the end portion of the first shaft portion 14 on the opposite side (protruding direction of the stepped shaft portion 17) to the base portion 13 and has a larger diameter than the first shaft portion 14 via a first stepped portion 14*a*, and a third shaft portion 16 that is integrally formed in the end portion of the second shaft portion 15 on the opposite side to the base portion 13 and has a larger diameter than the second shaft portion 15 via a second stepped portion 15*a*.

A length L2 of the second shaft portion 15 in the axial direction is shorter than a length L1 of the first shaft portion 14 in the axial direction. A length L3 of the third shaft portion 16 in the axial direction is shorter than the length L2 of the second shaft portion 15 in the axial direction. The first shaft portion 14 and the second shaft portion 15 are formed in a columnar shape, and the third shaft portion 16 is formed in a substantially disk shape.

Figure 5:
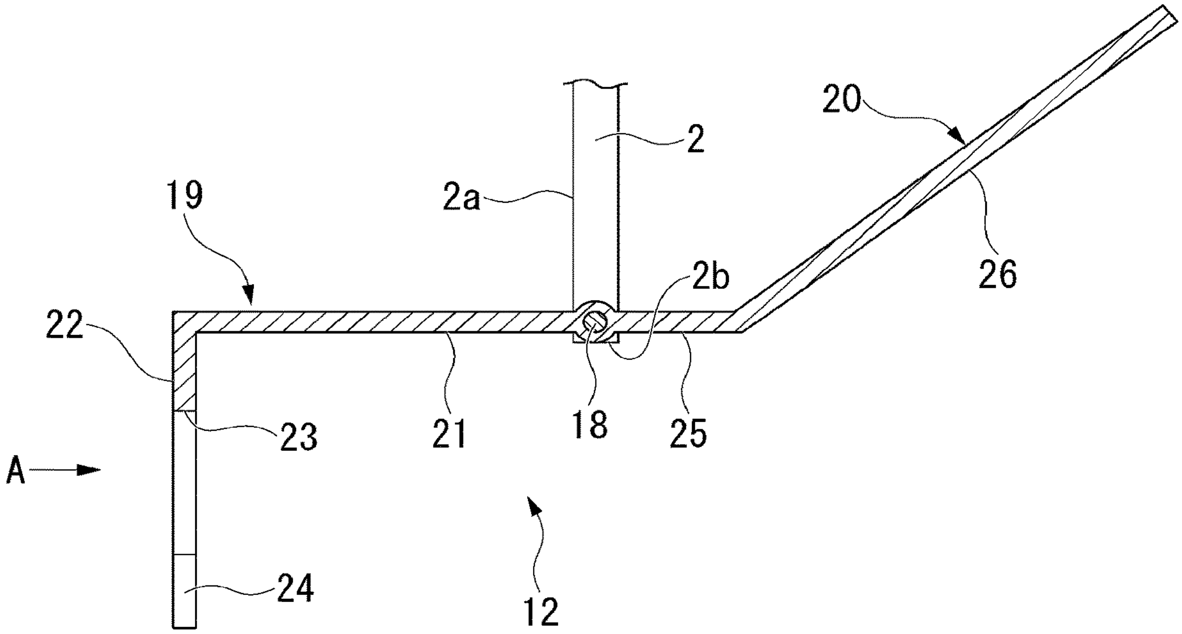
FIG. 5 is a side view of a hook according to the first embodiment.
Figure 6:
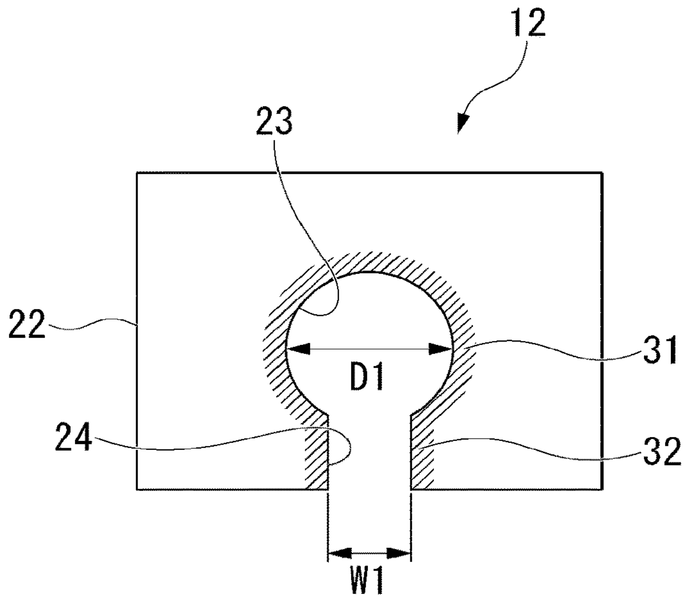
FIG. 6 is a view on an arrow A of FIG. 5.

FIG. 5 is a side view of the hook 12. FIG. 6 is a view on an arrow A of FIG. 5. As shown in FIGS. 1, 5, and 6, the hook 12 includes a rotation shaft (an example of the rotation axis in the claim) 18 that is rotatably provided at the peripheral edge of the opening portion 2*b* of the housing 2, and an engaging portion (an example of a hook side engaging portion in the claim) 19 and a pressing portion (an example of a hook side pressing portion in the claim) 20 that are provided at both sides with the rotation shaft 18 interposed therebetween.

The rotation shaft 18 is disposed along the front surface 2*a* of the housing 2 and along the horizontal direction, and is rotatably supported by the housing 2.

The engaging portion 19 is formed by bending a member that has a rectangular plate-shape. Specifically, the engaging portion 19 includes a support plate 21 that extends from the rotation shaft 18 along one direction, and an engagement piece 22 that is bent and extends from the end portion of the support plate 21 on the opposite side to the rotation shaft 18. The angle between the support plate 21 and the engagement piece 22 is approximately 90°.

The engagement piece 22 includes an opening portion (an example of a second opening portion in the claim) 23 formed at most of at the center in the plane direction. The opening portion 23 is formed in a circular shape as viewed from the normal direction of the engagement piece 22. A receiving opening portion (an example of a first opening portion in the claim) 24 is formed in a distal end portion of the engagement piece 22 on the opposite side to the support plate 21.

A width W1 of the receiving opening portion 24 as viewed from the normal direction of the engagement piece 22 is smaller than a diameter D1 of the opening portion 23. More specifically, the diameter D1 of the opening portion 23 is larger than a shaft diameter D2 of the second shaft portion 15, and is smaller than a shaft diameter D3 of the third shaft portion 16. The width W1 of the receiving opening portion 24 is larger than a shaft diameter D4 of the first shaft portion 14, and is smaller than the shaft diameter D2 of the second shaft portion 15.

The pressing portion 20 that is provided on the opposite side to the engaging portion 19 with the rotation shaft 18 interposed therebetween is formed by bending the member that has a rectangular plate shape. Specifically, the pressing portion 20 includes an extension piece 25 that extends on the same plane as the support plate 21 of the engaging portion 19 along the other direction opposite to the support plate 21 from the rotation shaft 18, and a pressed plate 26 that is bent and extends from the end portion of the extension piece 25 on the opposite side to the rotation shaft 18. A bending direction of the pressed plate 26 is a direction opposite to a bending direction of the engagement piece 22 of the engaging portion 19. The angle between the extension piece 25 and the pressed plate 26 is larger than the angle between the support plate 21 and the engagement piece 22.

The hook 12 formed as described above is disposed such that the engaging portion 19 faces the back surface 3*a* side of the door 3. The hook 12 swings in the vertical direction centered on the rotation shaft 18 in a state of facing the back surface 3*a* side of the door 3. On the other hand, the pressing portion 20 swings in the vertical direction centered on the rotation shaft 18 in a state of facing the inside of the housing 2.

Here, the hook 12, which is disposed on the upper end portion, of two hooks 12 disposed on the upper and lower end portions of the housing 2 is formed such that a weight of the pressing portion 20 is heavier than a weight of the engaging portion 19. The hook 12 disposed on the lower end portion is formed such that a weight of the engaging portion 19 is heavier than a weight of the pressing portion 20. Therefore, in the hook 12 disposed on the upper end portion, the pressing portion 20 faces downward and the engaging portion 19 rises upward due to the own weight of the hook 12 under a normal condition in which no external force is applied. In the hook 12 disposed on the lower end portion, the engaging portion 19 faces downward and the pressing portion 20 rises upward due to the own weight of the hook 12 under a normal condition in which no external force is applied.

In such states, the handle lock state is released. Then, in the hook 12 disposed on the upper end portion, the distal end (the other end) of the lock rod 9 is positioned on the engaging portion 19 directly below the pressed plate 26. In the hook 12 disposed in the lower end portion, the distal end (the other end) of the lock rod 9 is positioned on the engaging portion 19 directly above the pressed plate 26.

The peripheral edge of the opening portion 2*b* in the housing 2 may be cut out such that interference with the engaging portion 19 is avoided. In FIG. 1, the peripheral edge of the opening portion 2*b* is shown in a state of being cut out. In a case in which the peripheral edge of the opening portion 2*b* is not cut out, the engaging portion 19 is positioned in front of the opening portion 2*b* (door 3 side).

Hereinafter, the operation of the lock mechanism 5 will be described with reference to FIGS. 7 to 10.

FIGS. 7 to 10 are operation explanatory views of the lock mechanism 5. The operations of the two lock mechanisms 5 provided in the upper and lower end portions of the housing 2 and the door 3 are the same. Therefore, in the following description, among the two lock mechanisms 5, the lock mechanism 5 provided in the upper end portions of the housing 2 and the door 3 will be described, and if necessary, the lock mechanism 5 provided in the lower end portions of the housing 2 and the door 3 will be described.

Figure 7:
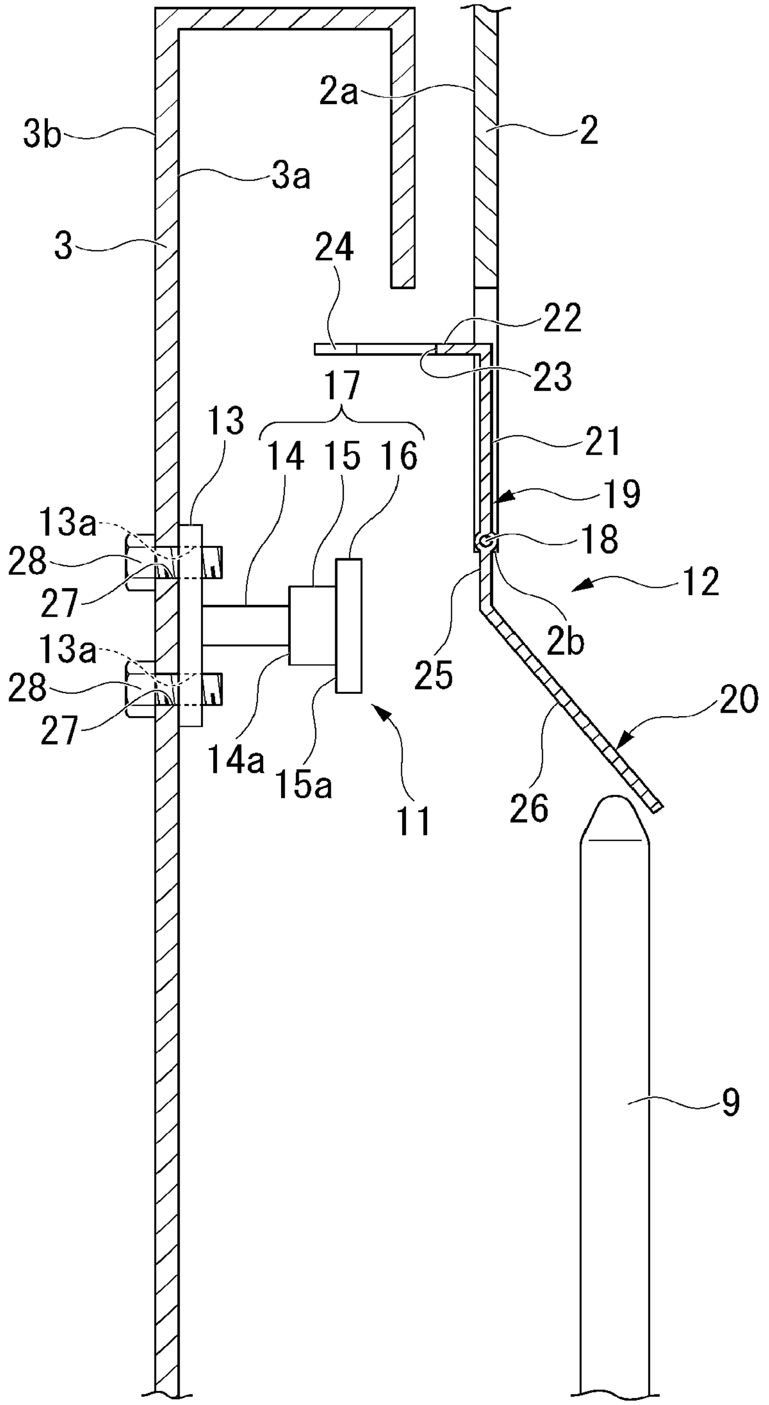
FIG. 7 is an operation explanatory view of a lock mechanism according to the first embodiment.
Figure 8:
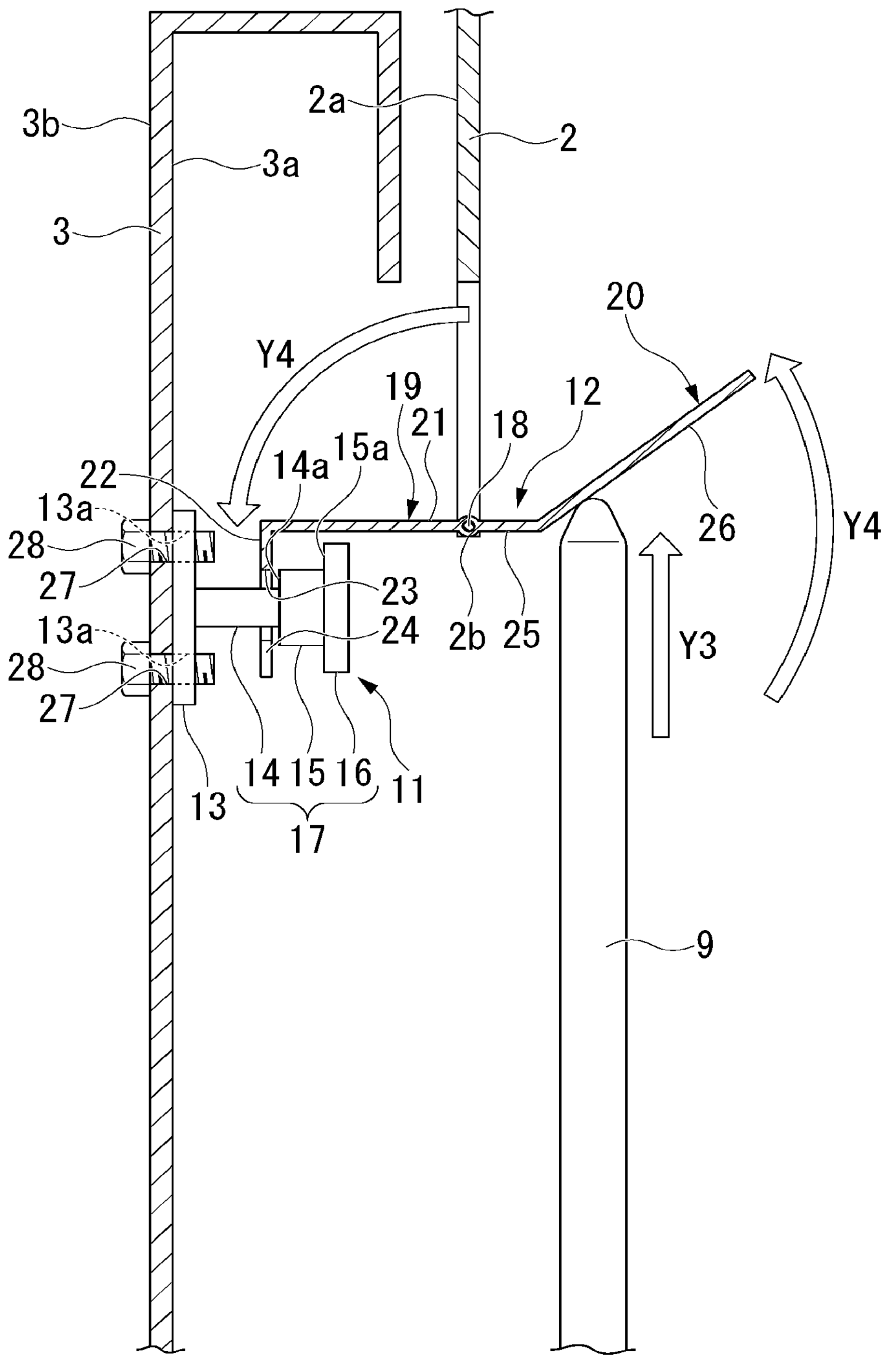
FIG. 8 is an operation explanatory view of the lock mechanism according to the first embodiment.

As shown in FIG. 7, among two lock mechanisms 5, in the hook 12 disposed on the upper end portion of the housing 2, the pressing portion 20 faces downward and the engaging portion 19 rises upward due to own weight of the hook 12 under a normal condition in which no external force is applied. In a case in which the door 3 is closed to be in the handle lock state from such a state, the lock rod 9 slidingly moves in the vertical direction as shown in FIG. 8 (see arrow Y3 in FIG. 8). Then, the distal end of the lock rod 9 presses up the pressed plate 26 of the hook 12. From this, the hook 12 is rotated centered on the rotation shaft 18 (see arrow Y4 in FIG. 8).

Then, the engaging portion 19 of the hook 12 is lowered, and the hook 12 engages with the lock protrusion portion 11 provided in the door 3. Specifically, in a state in which the door 3 is closed and the engaging portion 19 of the hook 12 is lowered, the first shaft portion 14 of the lock protrusion portion 11 is positioned at the position of the engagement piece 22 of the hook 12. The width W1 of the receiving opening portion 24 of the engagement piece 22 is larger than the shaft diameter D4 of the first shaft portion 14. Therefore, in a case in which the engaging portion 19 of the hook 12 is lowered, the first shaft portion 14 of the lock protrusion portion 11 passes through the receiving opening portion 24 of the engagement piece 22, further the first shaft portion 14 is positioned in the opening portion 23 of the engagement piece 22. Hereinafter, the state described above is referred to as an engagement preliminary state of the hook 12. In the engagement preliminary state of the hook 12, the handle is in the locked state.

Next, a case will be described in which an arc flash or the like occurs in the housing 2 in the engagement preliminary state of the hook 12.

Figure 9:
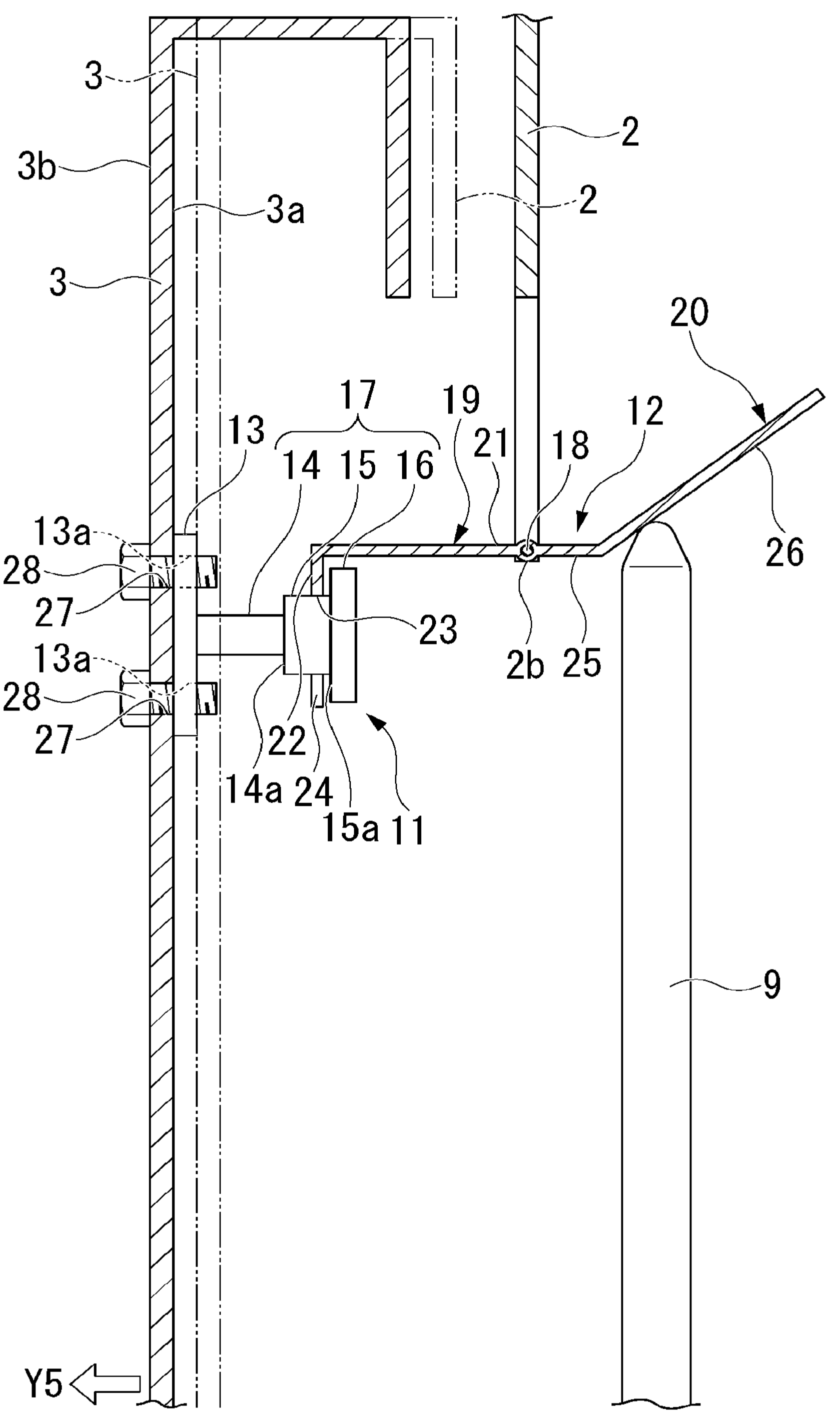
FIG. 9 is an operation explanatory view of the lock mechanism according to the first embodiment.

As shown in FIG. 9, in a case in which an arc flash or the like occurs in the housing 2, the door 3 is pressed from the inside due to the impact and is to be opened (see arrow Y5 in FIG. 9). In this case, the lock protrusion portion 11 is moved to the outside integrally with the door 3.

Here, the diameter D1 of the opening portion 23 of the engagement piece 22 of the hook 12 is larger than a shaft diameter D2 of the second shaft portion 15, and is smaller than a shaft diameter D3 of the third shaft portion 16. Therefore, in a case in which the lock protrusion portion 11 is moved to the outside integrally with the door 3, the second shaft portion 15 is fitted into the opening portion 23 of the engagement piece 22, and the third shaft portion 16 abuts against the engagement piece 22. In such a state, the hook 12 is completely engaged with the lock protrusion portion 11. Hereinafter, the state described above is referred to as an engagement state of the hook 12. Therefore, the movement of the lock protrusion portion 11 to the outside is restricted. By restricting the movement of the lock protrusion portion 11 to the outside, the movement of the door 3 in the opening portion direction is also restricted.

The width W1 of the receiving opening portion 24 of the engagement piece 22 is smaller than the shaft diameter D2 of the second shaft portion 15. Therefore, in a state in which the second shaft portion 15 is fitted into the opening portion 23 of the engagement piece 22, for example, the engaging portion 19 of the hook 12 is prevented from rising due to an impact in a case in which an arc flash or the like occurs in the housing 2. That is, the engagement state of the hook 12 is prevented from being released.

As described above, the periphery of the opening portion 23 of the engagement piece 22 (see the shaded portion in FIG. 6) functions as a first restricting portion 31 that restricts coming-off from the lock protrusion portion 11 in the axial direction (protruding direction of the lock protrusion portion 11). The periphery of the receiving opening portion 24 of the engagement piece 22 (see the shaded portion in FIG. 6) functions as a second restricting portion 32 that restricts coming-off from the lock protrusion portion 11 in the disengagement direction (a direction intersecting the protruding direction of the lock protrusion portion 11).

By the way, in the engagement state of the hook 12, for example, there is a possibility that the door 3 is deformed or the lock rod 9 is deformed by the impact in a case in which, for example, an arc flash or the like occurs in the housing 2, and the engagement state of the hook 12 cannot be released.

Figure 10:
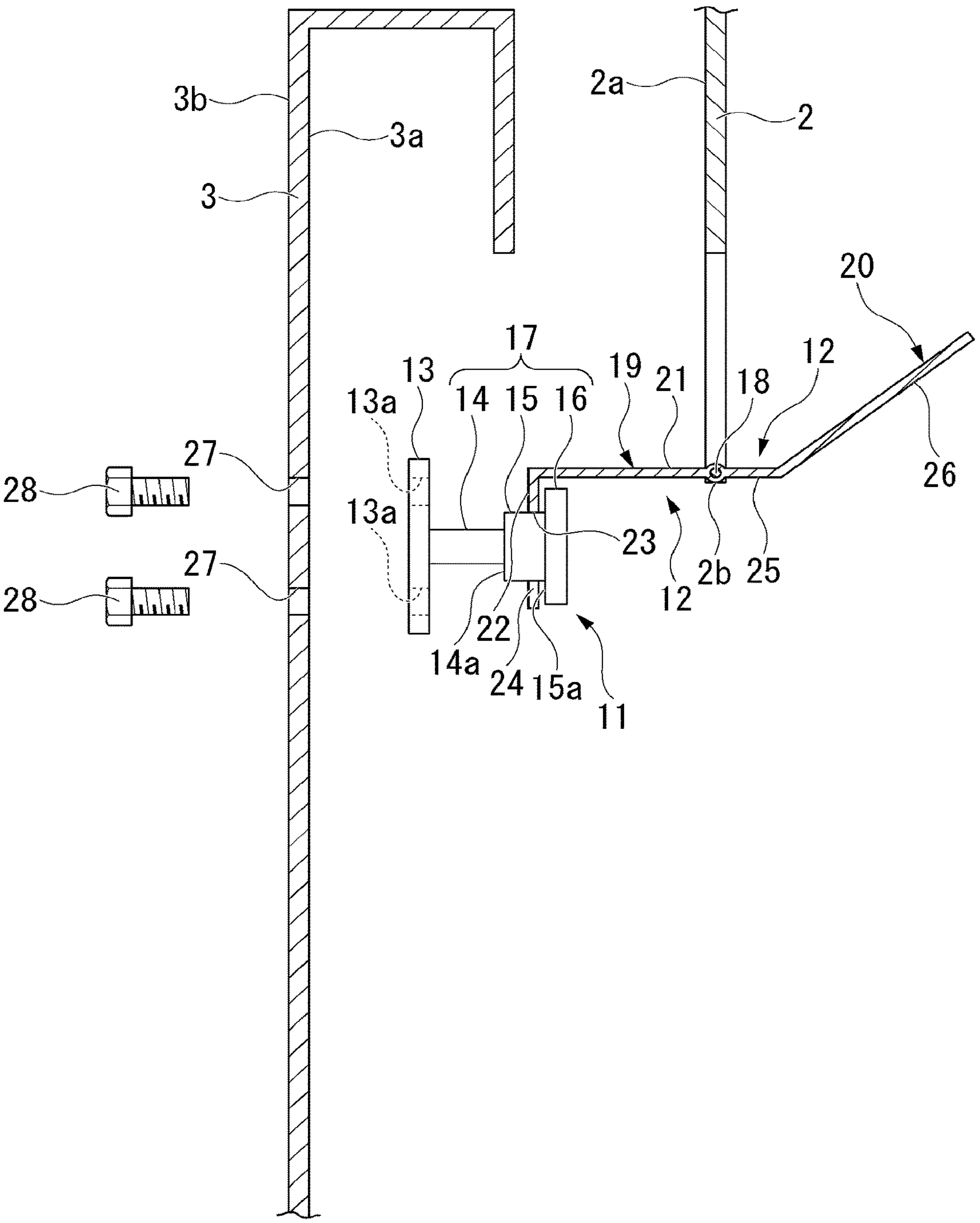
FIG. 10 is an operation explanatory view of the lock mechanism according to the first embodiment.

Here, the lock protrusion portion 11 is fastened and fixed to the door 3 by the bolt 28 inserted from the front surface 3*b* side of the door 3. Therefore, as shown in FIG. 10, the lock protrusion portion 11 can be removed from the door 3 by loosening and removing the bolt 28 from the front surface 3*b* side of the door 3. As a result, it is possible to open the door 3.

As described above, the control panel 1 according to the first embodiment above includes the lock mechanisms 5 which are provided on the upper and lower end portions. The lock mechanism 5 includes a lock protrusion portion 11 provided in the door 3 and the hook 12 that is provided in the housing 2 and is engageable with the lock protrusion portion 11. Among two hooks 12, the hook 12 disposed on the upper end portion is in the disengagement state with the lock protrusion portion 11 in which the engaging portion 19 rises upward under a normal condition in which no external force is applied. Among two hooks 12, the hook 12 disposed on the lower end portion is in the disengagement state with the lock protrusion portion 11 in which the engaging portion 19 faces downward under a normal condition in which no external force is applied. Further, the hook 12 includes the pressed plate 26 pressed by the lock rod 9 that is provided separately from the hook 12, and the engagement piece 22. In a case in which the pressed plate 26 is pressed by the lock rod 9, the engagement piece 22 engages with the lock protrusion portion 11. The lock mechanism 5 can be configured with a simple structure as described above. Further, the lock mechanism 5 can be operated in conjunction with the handle unit 4, so that the opening portion and closing operation of the door 3 can be simplified while satisfying the explosion proof function of the control panel 1.

The lock protrusion portion 11 includes the stepped shaft portion 17 including the first shaft portion 14, the second shaft portion 15, and the third shaft portion 16. The engagement piece 22 forms the opening portion 23 and the receiving opening portion 24 to have the first restricting portion 31 and the second restricting portion 32. Coming-off from the lock protrusion portion 11 in the axial direction can be restricted by the first restricting portion 31. Coming-off from the lock protrusion portion 11 in the disengagement direction can be restricted by the second restricting portion 32. Thus, the lock mechanism 5 can surely satisfy the explosion proof function of the control panel 1.

By forming the lock protrusion portion 11 into a stepped shape having the first shaft portion 14, the second shaft portion 15, and the third shaft portion 16, it is possible to obtain two states of a state in which the engagement piece 22 is interposed in the first shaft portion 14 and a state in which the opening portion 23 of the engagement piece 22 is fitted into the second shaft portion 15. Therefore, in a case in which there is no abnormality in the control panel 1, the lock mechanism 5 can be easily released, so that the lock mechanism 5 can be easily used.

By providing the lock protrusion portion 11 on the door 3 side and providing the hook 12 on the housing 2 side, it is possible to easily dispose the hook 12. In a case in which the hook 12 is attempted to be provided on the door 3 side, there is a possibility that the door 3 needs to be processed in order to secure the operation space for the hook 12. Therefore, by providing the lock protrusion portion 11 on the door 3 side and providing the hook 12 on the housing 2 side, it is possible to easily provide the lock mechanism 5 on the existing control panel 1.

The lock rod 9 is used as means for pressing the pressed plate 26 of the hook 12. For example, in many cases, the lock rod 9 is prepared in the existing control panel 1 for engaging with the peripheral edge of the opening portion 2*b* of the housing 2. The lock mechanism 5 can be further simplified by using such a lock rod 9. Further, it is possible to more easily provide the lock mechanism 5 in the existing control panel 1.

The lock protrusion portion 11 is fastened and fixed to the door 3 by the bolt 28 inserted from the front surface 3*b* side of the door 3. Therefore, the lock protrusion portion 11 can be easily removed from the front surface 3*b* side of the door 3. Therefore, in a state in which the second shaft portion 15 is fitted into the opening portion 23 of the engagement piece 22, even in a case in which the door 3 is deformed or the lock rod 9 is deformed by the impact in a case in which, for example, an arc flash or the like occurs in the housing 2, the lock mechanism 5 can be easily disengaged and the door 3 can be opened.

First Modification Example

Next, a first modification example will be described with reference to FIG. 11.

Figure 11:
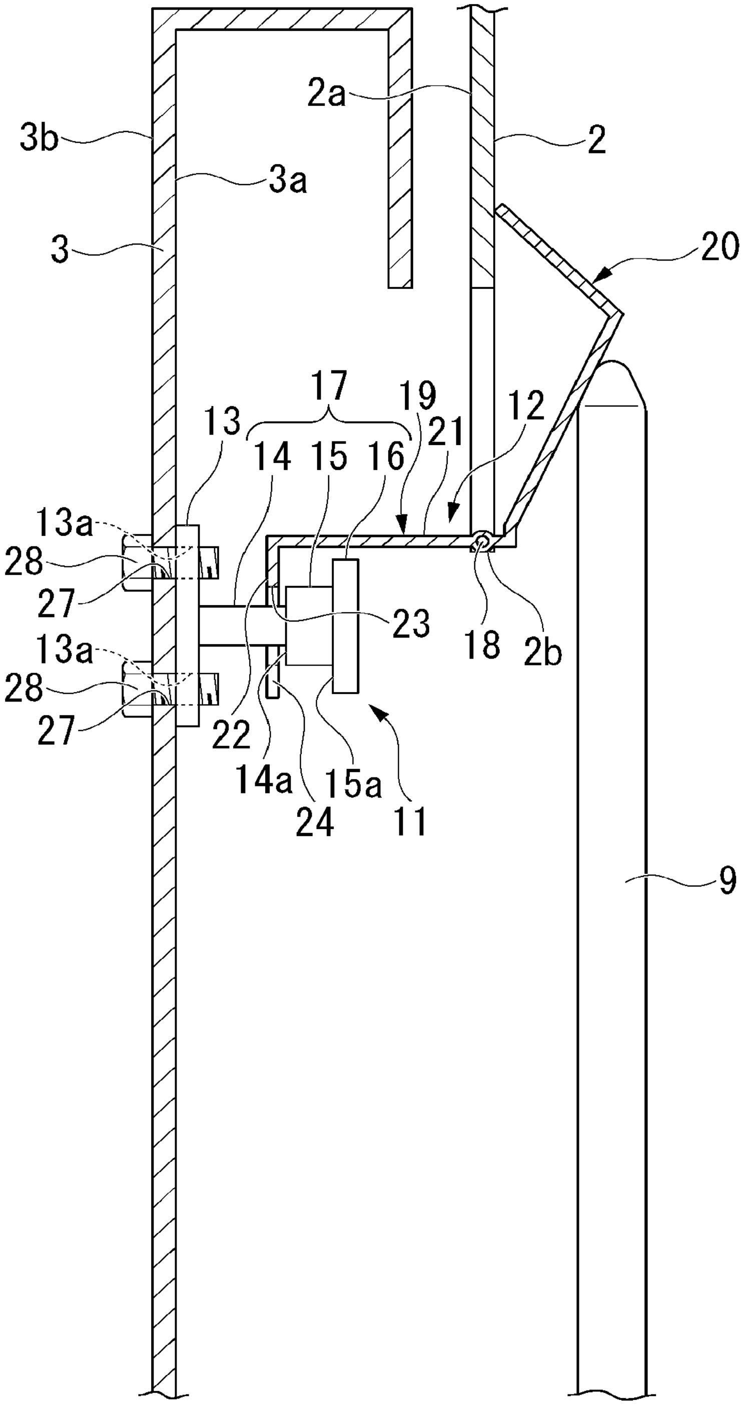
FIG. 11 is a schematic configuration diagram of a hook according to a first modification example in the embodiment.

FIG. 11 is a schematic configuration diagram of a hook 12 according to the first modification example.

As shown in FIG. 11, in the pressing portion 20 of the hook 12 in the modification example, the angle between the extension piece 25 and the pressed plate 26 is smaller than the angle between extension piece 25 and the pressed plate 26 in the first embodiment described above. Furthermore, the pressed plate 26 is bent and formed. Therefore, in the engagement preliminary state of the hook 12, the pressed plate 26 engages with the peripheral edge of the opening portion 2*b* of the housing 2.

Therefore, according to the first modification example, the same effect as that of the first embodiment described above is obtained. Further, in a case of closing the door 3, the door 3 engages with the housing 2 at three locations. That is, the door 3 engages with the housing 2 by the handle unit 4 and the two pressed plates 26. As a result, the closed state of the door 3 can be firmly maintained, and the explosion proof function of the control panel 1 can be further improved.

In the first embodiment described above and the first modification example, a case has been described in which the lock protrusion portion 11 is provided in the door 3 as a member to be engaged with the hook 12. However, the present invention is not limited to this, and the member need only be a protrusion portion shape that is engageable with the hook 12. In order to correspond to the protrusion portion shape, it is desirable to provide, in the hook 12, a portion corresponding to the first restricting portion 31 that restricts coining-off in the protruding direction with respect to the protrusion portion shape and a portion corresponding to the second restricting portion 32 that restricts coming-off in the direction intersecting the protruding direction with respect to the protrusion portion shape.

Second Embodiment

Next, a second embodiment will be described with reference to FIGS. 12 to 15.

Figure 12:
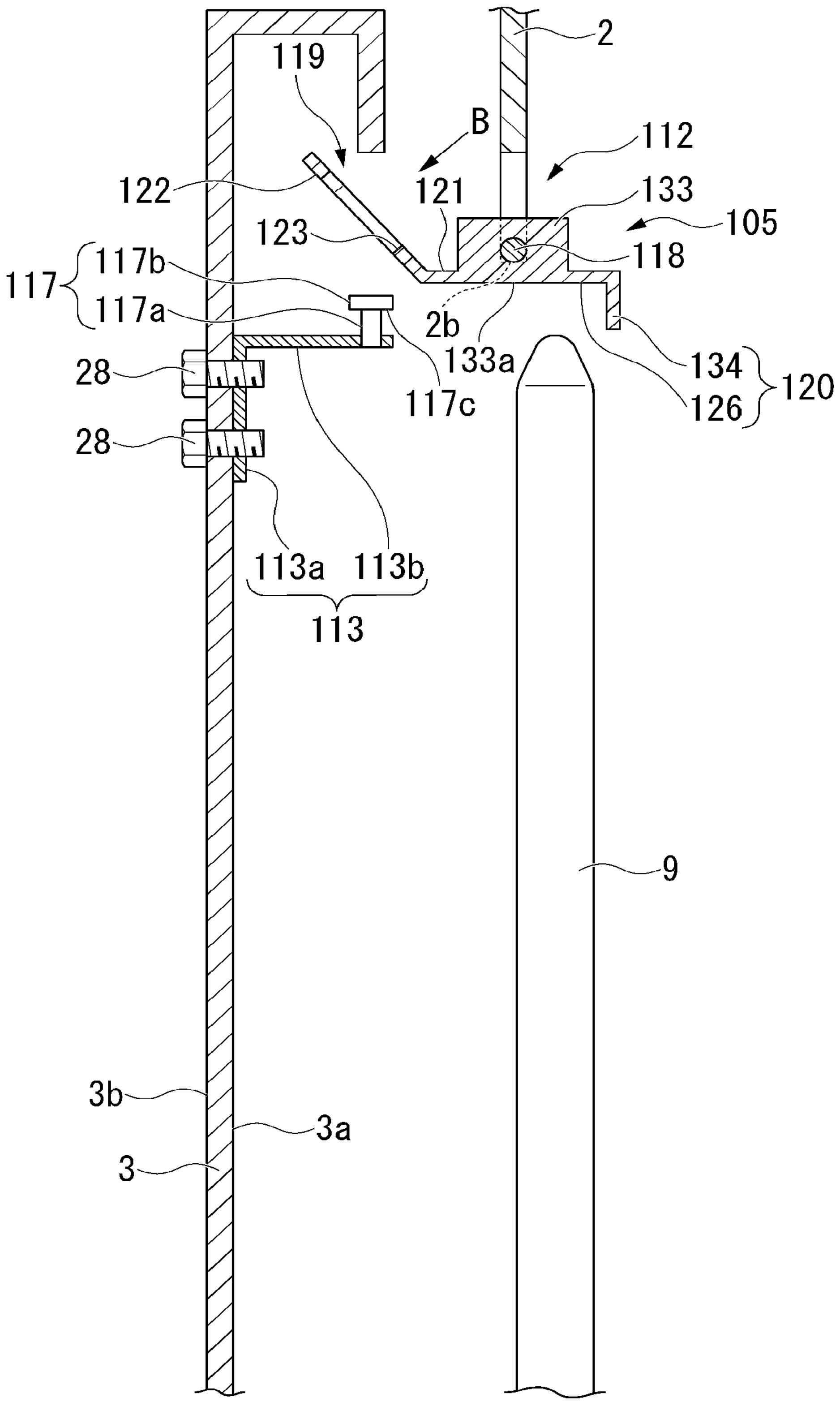
FIG. 12 is a schematic configuration diagram of a control panel according to a second embodiment.

FIG. 12 is a schematic configuration diagram showing details of a lock mechanism 105 of the control panel 101 according to the second embodiment. FIG. 12 corresponds to FIG. 7 in the first embodiment described above. In the following description, the same reference numerals as those in the first embodiment described above will be designated and the description thereof will be omitted.

As shown in FIG. 12, the control panel 101 according to the second embodiment has the same basic configuration as that of the first embodiment described above in that the housing 2, the door 3 that opens and closes the opening portion 2*b* of the housing 2, the handle unit 4 (see FIG. 1, not shown in FIG. 12) that is provided in the door 3, and the lock mechanism 105 that is provided between the housing 2 and the door 3 are provided, the lock mechanism 105 is disposed close to the upper and lower end portions of the housing 2 and the door 3 and the other ends of the corresponding lock rods 9, the two lock mechanisms 5 provided in the upper and lower end portions of the housing 2 and the door 3 are disposed in opposite directions in the vertical direction, and have the same structure.

The difference between the first embodiment and the second embodiment is that the lock mechanism 5 of the first embodiment is different from the lock mechanism 105 of the second embodiment.

In the following description, among the two lock mechanisms 105, the lock mechanism 105 provided in the upper end portions of the housing 2 and the door 3 will be described, and if necessary, the lock mechanism 105 provided in the lower end portions of the housing 2 and the door 3 will be described.

The lock mechanism 105 includes a lock protrusion portion (an example of a protrusion portion in the claim) 111 that is provided on the hack surface 3*a* of the door 3, and a hook 112 that is provided in the peripheral edge of the opening portion 2*b* of the housing 2.

The lock protrusion portion 111 includes a base portion 113 that is fixed to the back surface 3*a* of the door 3, and a shaft portion 117 that protrudes from the base portion 113.

The base portion 113 includes a contact portion 113*a* that comes into contact with the back surface 3*a* of the door 3 and a pedestal portion 113*b* that is bent and extends from the upper end of the contact portion 113*a* toward the housing 2 side and along the horizontal direction. The contact portion 113*a* is fastened and fixed to the door 3 by the bolt 28 inserted from the front surface 3*b* side of the door 3.

On the upper surface of the pedestal portion 113*b*, the shaft portion 117 protrudes along the vertical direction. The shaft portion 117 includes a columnar shaft portion body (an example of a fourth shaft portion in the claim) 117*a*, and a disk-shaped head portion (an example of a fifth shaft portion in the claim) 117*b* that is integrally formed in the upper end of the shaft portion body 117*a*, and is formed to have a larger diameter than the shaft portion body 117*a* via a stepped portion 117*c*.

Figure 13:
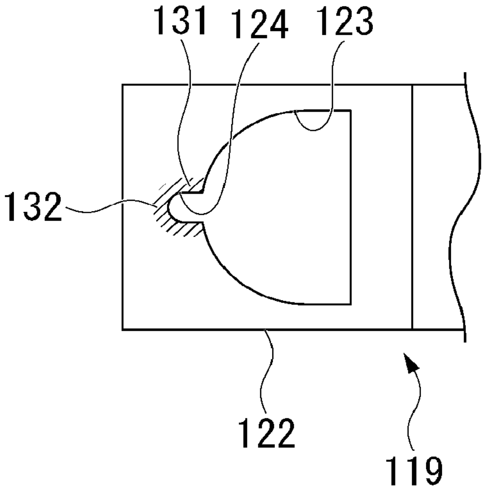
FIG. 13 is a view on an arrow B of FIG. 12.

FIG. 13 is a view on an arrow B of FIG. 12.

As shown in FIGS. 12 and 13, the hook 112 includes a rotation shaft (an example of the rotation axis in the claim) 118 that is rotatably provided at the peripheral edge of the opening portion 2*b* of the housing 2, a support plate 133 that is rotatably supported by the rotation shaft 118, an engaging portion (an example of a hook side engaging portion in the claim) 119 that extends from one side 133*a* of the support plate 133 toward the door 3 side, and a pressing portion (an example of a hook side pressing portion in the claim) 120 that extends from one side 133*a* of the support plate 133 toward the opposite side to the engaging portion 119. The hook 112 is formed such that one side 133*a* of the support plate 133 is positioned on the lower side due to its own weight. One side 133*a* of the support plate 133 is along the horizontal direction in a state of not receiving an external force.

The engaging portion 119 is formed by bending a member that has a rectangular plate-shape. Specifically, the engaging portion 119 includes an extending plate 121 that extends along one side 133*a* of the support plate 133 and an engagement piece 122 that is bent and extends from the end portion of the extending plate 121 on the opposite side to the support plate 133. The engagement piece 122 extends diagonally upward in a state in which one side 133*a* of the support plate 133 is positioned on the lower side.

The engagement piece 122 includes an opening portion (an example of a fourth opening portion in the claim) 123 formed at most of at the center in the plane direction. The opening portion 123 is formed in a semicircular shape in which the opposite side to the support plate 133 is protrusion portion as viewed from the normal direction of the engagement piece 22. The size of the opening portion 123 is the size that both the shaft portion body 117*a* and the head portion 117*b* of the shaft portion 117 can pass through.

A small opening portion (an example of a third opening portion in the claim 124 is formed at the center of the opening portion 123 on the protrusion portion side. The small opening portion 124 communicates with the opening portion 123. Further, the distal end portion of the small opening portion 124 on the opposite side to the opening portion 123 does not penetrate the outside of the engagement piece 122 and is closed. The size of the small opening portion 124 is the size that the shaft portion body 117*a* of the shaft portion 117 can pass through and the head portion 117*b* cannot pass through.

The pressing portion 120 that is provided on the opposite side to the engaging portion 119 with the engagement piece 122 of the support plate 133 interposed therebetween is formed by bending the member that has a rectangular plate shape. Specifically, the pressing portion 120 includes a pressed plate 126 that extends along one side 133*a* of the support plate 133 and a return plate 134 that is bent and extends from the end portion of the pressed plate 126 on the opposite side to the support plate 133. The angle between the pressed plate 126 and the return plate 134 is approximately 90°.

The hook 12 formed as described above has a shape in which the engaging portion 119 swings in the vertical direction centered on the rotation shaft 18. Then, in a state in which the handle lock state is released, the distal end (the other end) of the lock rod 9 is positioned directly below the pressed plate 126. In the hook 112 disposed in the lower end portion, the distal end (the other end) of the lock rod 9 is positioned directly above the pressed plate 126.

Hereinafter, the operation of the lock mechanism 105 will be described with reference to FIGS. 12, 14, and 15.

Figure 14:
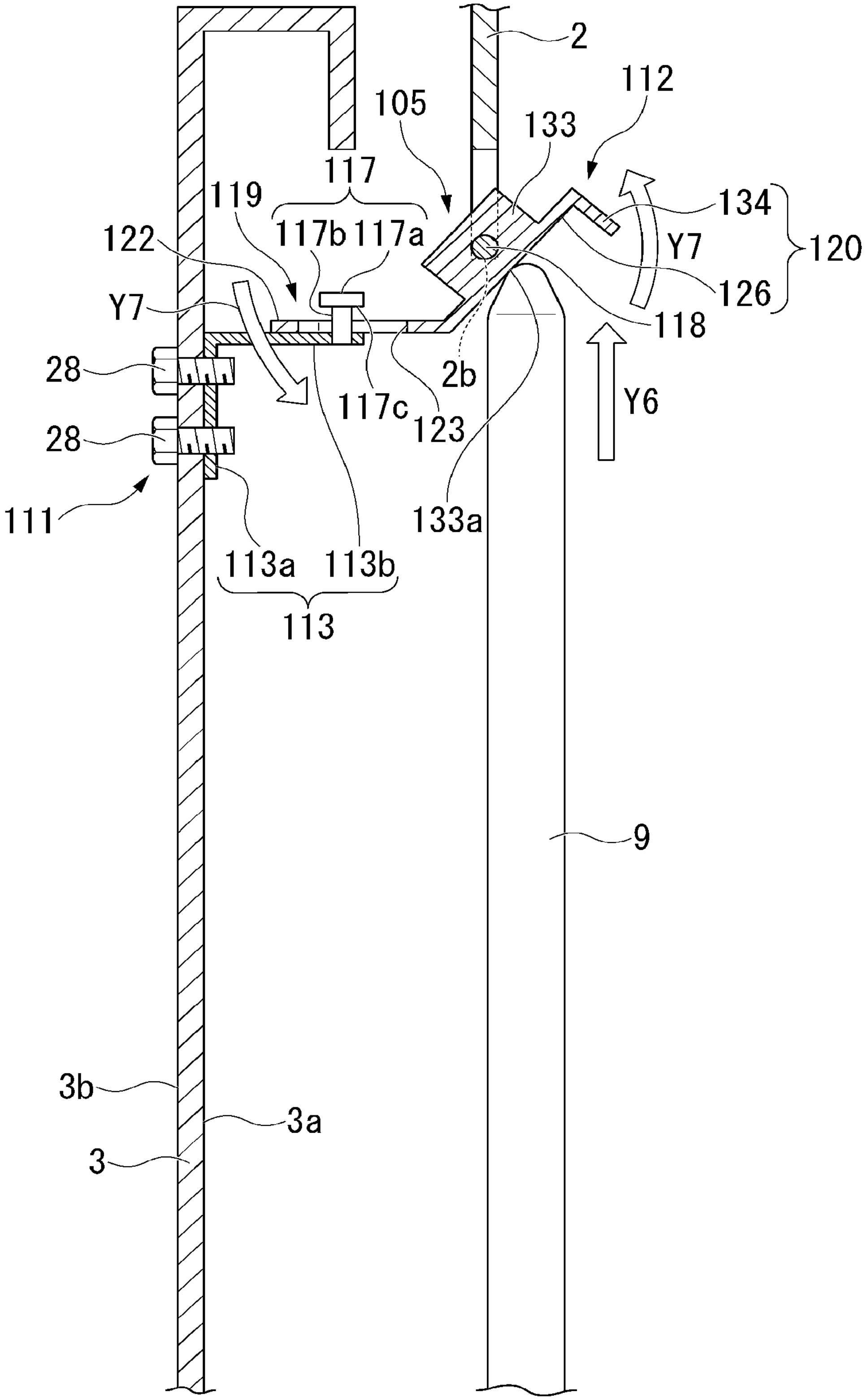
FIG. 14 is an operation explanatory view of the lock mechanism according to the second embodiment.
Figure 15:
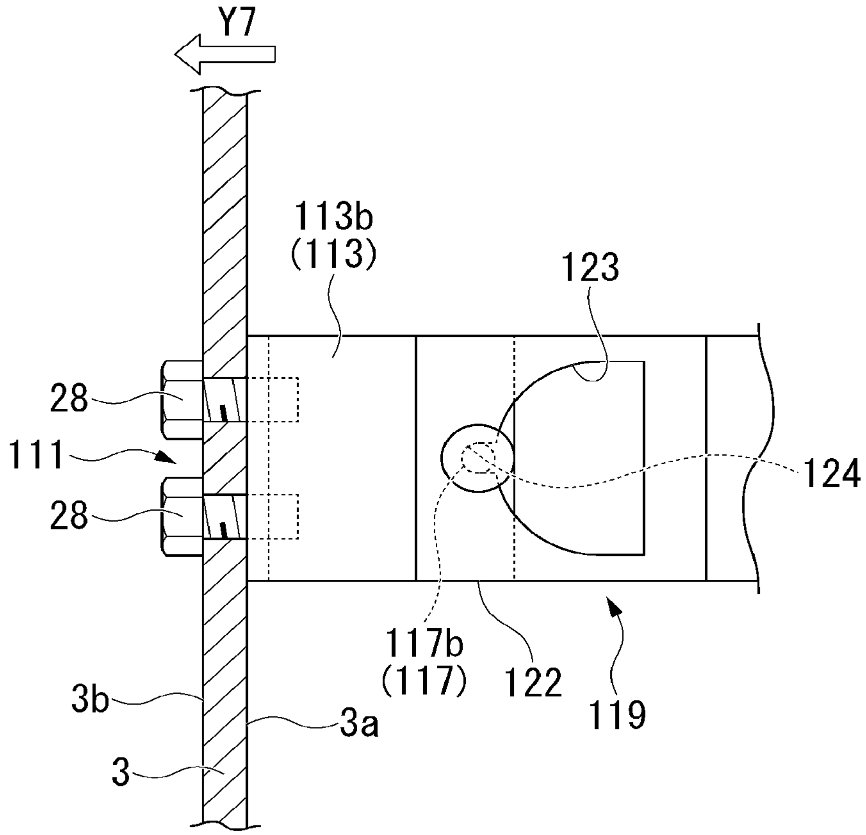
FIG. 15 is an operation explanatory view of the lock mechanism according to the second embodiment.

FIGS. 14 and 15 are operation explanatory views of the lock mechanism 105. FIG. 15 corresponds to FIG. 13. The operations of the two lock mechanisms 105 provided in the upper and lower end portions of the housing 2 and the door 3 are the same. Therefore, in the following description, among the two lock mechanisms 105, the lock mechanism 105 provided in the upper end portions of the housing 2 and the door 3 will be described, and if necessary, the lock mechanism 105 provided in the lower end portions of the housing 2 and the door 3 will be described.

As shown in FIG. 12, among two lock mechanisms 105, in the hook 112 disposed on the upper end portion of the housing 2, the one side 133*a* of the support plate 133 is positioned on the lower side and the engagement piece 122 rises diagonally upward due to own weight of the hook 112 under a normal condition in which no external force is applied. In a case in which the door 3 is closed to be in the handle lock state from the state described above, the lock rod 9 slidingly moves in the vertical direction as shown in FIG. 14 (see arrow Y6 in FIG. 14). Then, the distal end of the lock rod 9 presses up the pressed plate 126 of the hook 112. From this, the hook 112 is rotated centered on the rotation shaft 118 (see arrow Y7 in FIG. 14).

Then, the engaging portion 119 of the hook 112 is lowered, and the hook 112 engages with the lock protrusion portion 111 provided in the door 3. Specifically, in a state in which the door 3 is closed and the engaging portion 119 of the hook 112 is lowered, the shaft portion 117 of the lock protrusion portion 111 is positioned at the position of the opening portion 123 formed in the engagement piece 122 of the hook 112. The size of the opening portion 123 is the size that both the shaft portion body 117*a* and the head portion 117*b* of the shaft portion 117 can pass through. Therefore, in a case in which the engaging portion 119 of the hook 112 is lowered, the shaft portion 117 passes through the opening portion 123, and the engagement piece 122 of the hook 112 comes into contact with the pedestal portion 113*b* of the lock protrusion portion 111. Hereinafter, the state described above is referred to as an engagement preliminary state of the hook 112. In the engagement preliminary state of the hook 112, the handle is in the locked state.

Next, a case will be described in which an arc flash or the like occurs in the housing 2 in the engagement preliminary state of the hook 12.

As shown in FIG. 15, in a case in which an arc flash or the like occurs in the housing 2, the door 3 is pressed from the inside due to the impact and is to be opened (see arrow Y7 in FIG. 15). In this case, the lock protrusion portion 111 is moved to the outside integrally with the door 3.

Here, the size of the small opening portion 124 of the engagement piece 122 of the hook 112 is the size that the shaft portion body 117*a* of the shaft portion 117 can pass through. Therefore, in a case in which the lock protrusion portion 111 is moved to the outside integrally with the door 3, the shaft portion body 117*a* of the shaft portion 117 is fitted into the small opening portion 124 of the engagement piece 122, and the shaft portion body 117*a* abuts against the distal end portion of the small opening portion 124. In such a state, the hook 112 is completely engaged with the lock protrusion portion 111. Hereinafter, the state described above is referred to as an engagement state of the hook 112. Therefore, the movement of the lock protrusion portion 111 to the outside is restricted. By restricting the movement of the lock protrusion portion 111 to the outside, the movement of the door 3 in the opening portion direction is also restricted.

Further, the size of the small opening portion 124 is the size that the head portion 117*b* of the shaft portion 117 cannot pass through. Therefore, in a state in which the shaft portion body 117*a* is fitted into the small opening portion 124 of the engagement piece 122, for example, the engaging portion 119 of the hook 112 is prevented from rising due to an impact in a case in which an arc flash or the like occurs in the housing 2. That is, the engagement state of the hook 112 is prevented from being released.

As described above, the periphery of the small opening portion 124 of the engagement piece 122 (see the shaded portion in FIG. 13) functions as a first restricting portion 131 that restricts coming-off from the shaft portion 117 of the lock protrusion portion 111 in the axial direction (protruding direction of the shaft portion 117). Further, the periphery of the small opening portion 124 functions as a second restricting portion 132 that restricts coining-off in the direction intersecting the protruding direction of the shaft portion 117 (see FIG. 13).

Therefore, in the second embodiment described above, the same effect as that of the first embodiment described above is obtained.

In the second embodiment described above, a case has been described in which the lock protrusion portion 111 is provided in the door 3 as a member to be engaged with the hook 112. However, the present invention is not limited to this, and the member need only be a protrusion portion shape that is engageable with the hook 112. In order to correspond to the protrusion portion shape, it is desirable to provide, in the hook 112, a portion corresponding to the first restricting portion 131 that restricts coming-off in the protruding direction with respect to the protrusion portion shape and a portion corresponding to the second restricting portion 132 that restricts corning-off in the direction intersecting the protruding direction with respect to the protrusion portion shape.

In the second embodiment described above, the configuration of the first modification example described above may be adopted as the configuration of the pressed plate 126. That is, in the handle lock state (engagement state of the hook 12), the pressed plate 126 may be configured to be engaged with the peripheral edge of the opening portion 2*b* of the housing 2.

Second Modification Example and Third Modification Example

In the first modification example described above, in the handle lock state (engagement state of the hook 12), a case has been described in which the pressed plate 26 engages with the peripheral edge of the opening portion 2*b* of the housing 2. However, the present invention is not limited to this, and the lock rod 9 may be engaged with the peripheral edge of the opening portion 2*b* of the housing 2 in the handle lock state. Hereinafter, a specific example will be described.

Figure 16:
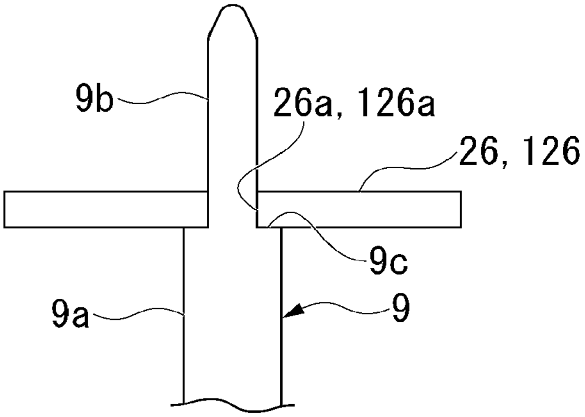
FIG. 16 is a schematic configuration diagram of a hook and a lock rod according to a second modification example in the embodiment.

FIG. 16 is a schematic configuration diagram showing the engagement pieces 22 and 122, and the lock rod 9 of the hooks 12 and 122 according to the second modification example.

As shown in FIG. 16, the lock rod 9 may include a first rod portion 9*a*, and a second rod portion 9*b* that is formed on the distal end side of the first rod portion 9*a* and to have a smaller diameter than the first rod portion 9*a* via the stepped portion 9*c*. In this case, through holes 26*a* and 126*a* through which the first rod portion 9*a* cannot pass and the second rod portion 9*b* can pass are formed in the pressed plates 26 and 126 of the first embodiment and the second embodiment. With this configuration, in a case in of the handle lock state, the pressed plates 26 and 126 are pressed up (pressed down) by the stepped portion 9*c* of the lock rod 9.

The length of the second rod portion 9*b* is the length being capable of engaged with the peripheral edge of the opening portion 2*b* of the housing 2 in the handle lock state.

Therefore, according to the second modification example, the same effect as that of the first modification example described above is obtained.

Figure 17:
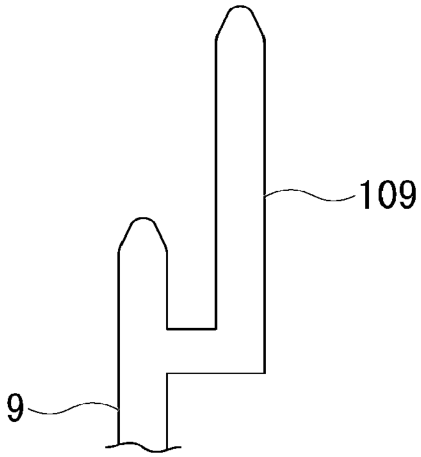
FIG. 17 is a schematic configuration diagram of a lock rod according to a third modification example in the embodiment.

FIG. 17 is a schematic configuration diagram of the lock rod 9 according to a third modification example.

As shown in FIG. 17, the lock rod 9 may have a sub lock rod 109 formed to protrude from the outer peripheral surface near the distal end (the other end). The sub lock rod 109 is formed to protrude from the lock rod 9 such that the interference with the pressed plates 26 and 126 according to the first embodiment and the second embodiment is avoided.

Under such a configuration, in the handle lock state, the sub lock rod 109 engages with the peripheral edge of the opening portion 2*b* of the housing 2.

Therefore, according to the third modification example, the same effect as that of the first modification example described above is obtained.

In the embodiments and the modification examples described above, a case has been described in which the lock rod 9 is operated in conjunction with the operation of the handle unit 4. However, the present invention is not limited thereto, and the lock rod 9 may also be operated independently. Further, instead of the lock rod 9, a pressing portion capable of pressing the pressed plates 26 and 126 may be provided. In these cases, a configuration is adopted in which the lock rod 9 or the pressing portion can be operated from the outside of the door 3 in a state in which the door 3 closed.

In the first embodiment and the second embodiment described above, a case has been described in which the hooks 12 and 112 are provided in the housing 2 and the lock protrusion portions 11 and 111 are provided in the door 3. However, the present invention is not limited thereto, and the hooks 12 and 112 may be provided in the door 3 and the lock protrusion portions 11 and 111 may be provided in the housing 2.

According to at least one embodiment described above, the control panels 1 and 101 include lock mechanisms 5 and 105. Among two hooks 12 and 112 of the lock mechanisms 5 and 105, the hooks 12 and 112 disposed on the upper end portion are in the disengagement state with the lock protrusion portions 11 and 111 in which the engaging portions 19 and 119 rise upward under a normal condition in which no external force is applied. Among two hooks 12 and 112, the hooks 12 and 112 disposed on the lower end portion are in the disengagement state with the lock protrusion portions 11 and 111 in which the engaging portions 19 and 119 face downward under a normal condition in which no external force is applied. Further, the hooks 12 and 112 include the pressed plates 26 and 126 pressed by the lock rod 9 that are provided separately from the hooks 12 and 112, and the engagement pieces 22 and 122. In a case in which the pressed plates 26 and 126 are pressed by the lock rod 9, the engagement pieces 22 and 122 are engaged with the lock protrusion portions 11 and 111. The lock mechanisms 5 and 105 can be configured with a simple structure as described above. Also, the opening portion and closing operation of the door 3 can be simplified while satisfying the explosion proof function of the control panels 1 and 101.

The embodiments of the present invention have been described, but the embodiments are presented as examples and are not intended to limit the scope of the present invention. The embodiments can be implemented in various other forms, and various omissions, replacements, and modifications can be made without departing from the gist of the present invention. The embodiments and modification examples thereof are included in the scope and gist of the present invention as well as in the scope of the present invention described in the claims and the equivalent scope thereof.

REFERENCE SIGNS LIST

- 1, 101: control panel
- 2: housing
- 2*b*: opening portion (housing opening portion)
- 3: door
- 4: handle unit (handle)
- 5, 105: lock mechanism
- 9: lock rod (pressing portion, rod body)
- 11, 111: lock protrusion portion (protrusion portion)
- 12, 112: hook
- 14: first shaft portion
- 15: second shaft portion
- 16: third shaft portion
- 17: stepped shaft portion
- 18: rotation shaft
- 19, 119: engaging portion (hook side engaging portion)
- 20, 120: pressing portion (hook side pressing portion)
- 23: opening portion (second opening portion)
- 24: receiving opening portion (first opening portion)
- 31, 131: first restricting portion
- 32, 132: second restricting portion
- 117: shaft portion
- 117*a*: shaft portion body (fourth shaft portion)
- 117*b*: head portion (fifth shaft portion)
- 123: opening portion (fourth opening portion)
- 124: small opening portion (third opening portion)

What is claimed is:

1. An explosion proof lock mechanism for an enclosure, the lock mechanism comprising:
   a protrusion portion that is provided in one of a housing and a door, the door is configured to open and close a housing opening portion of the housing;
   a hook that is provided in the other one of the housing and the door, the hook configured to be rotatable around a rotation axis, the hook is engageable with the protrusion portion when the hook pivoted to an engaging position, and the hook is normally disengaged from the protrusion portion by its own weight maintaining the hook in a disengaging position due to gravity; and a pressing portion that extends separately from the hook and the pressing portion is configured to press the hook when engaged by a vertically extending lock rod element, wherein the hook includes a hook side engaging portion that is configured to engage with the protrusion portion with the rotation axis interposed between a hook side pressing portion and the hook side engaging portion, where the hook side pressing portion is configured to cause the protrusion portion to engage with the hook side engaging portion by the hook side pressing portion being pressed by the pressing portion when engaged by the vertically extending lock rod element, and where the hook side engaging portion includes a first restricting portion that is configured to restrict the hook side engaging portion from coming-off the protrusion portion in a protruding direction of the protrusion portion after engagement with the engaging portion, and a second restricting portion that is configured to restrict coming-off in a direction intersecting the protruding direction of the protrusion portion after engagement with the engaging portion.

2. The lock mechanism according to claim 1, wherein the door includes a handle that is engageable with the housing, and the pressing portion is configured to press the hook side pressing portion in conjunction with an engagement operation of the handle with the housing.

3. The lock mechanism according to claim 1, wherein the engaging portion is a stepped columnar protrusion portion that is configured to protrude along an opening portion and closing direction of the door, the protrusion portion includes a first shaft portion, a second shaft portion that is provided in an end portion of the first shaft portion on a protruding direction side and has a larger diameter than the first shaft portion, and a third shaft portion that is provided in an end portion of the second shaft portion on the protruding direction side and has a larger diameter than the second shaft portion, the hook side engaging portion is provided to be movable along a direction intersecting an axial direction of each of the shaft portions, and the hook side engaging portion includes a first opening portion through which only the first shaft portion passes, and a second opening portion that communicates with the first opening portion and through which only the first shaft portion and the second shaft portion pass.

4. The lock mechanism according to claim 1, wherein the engaging portion is a stepped columnar protrusion portion that is configured to protrude along a direction intersecting an opening portion and closing direction of the door, the protrusion portion includes a fourth shaft portion, and a fifth shaft portion that is provided in an end portion of the fourth shaft portion on a protruding direction side and has a larger diameter than the fourth shaft portion, the hook side engaging portion is provided to be movable along an axial direction of each of the shaft portions, and the hook side engaging portion includes a third opening portion through which only the fourth shaft portion passes, and a fourth opening portion that communicates with the third opening portion and through which the fourth shaft portion and the fifth shaft portion pass.

5. The lock mechanism according to claim 1, wherein the engaging portion is provided in the housing, and the hook is provided in the door.

6. The lock mechanism according to claim 1, wherein the pressing portion is a rod body, and is configured to slidingly move in an axial direction of the rod body.

7. The lock mechanism according to claim 1, wherein, in a state in which the engaging portion is configured to engage with the hook side engaging portion, at least any one of the pressing portion and the hook side pressing portion is configured to engage with a peripheral edge of the housing opening portion.

* * * * *